US011078941B2

(12) United States Patent
La Barbera et al.

(10) Patent No.: US 11,078,941 B2
(45) Date of Patent: Aug. 3, 2021

(54) CAST-IN PLACE ANCHOR ASSEMBLY

(71) Applicant: BLACK & DECKER INC., New Britain, CT (US)

(72) Inventors: Robert La Barbera, New Rochelle, NY (US); Alan Armiento, New Rochelle, NY (US)

(73) Assignee: BLACK & DECKER INC., New Britain, CT (US)

( * ) Notice: Subject to any disclaimer, the term of this patent is extended or adjusted under 35 U.S.C. 154(b) by 59 days.

(21) Appl. No.: 16/705,426

(22) Filed: Dec. 6, 2019

(65) Prior Publication Data

US 2020/0224696 A1 Jul. 16, 2020

Related U.S. Application Data

(60) Provisional application No. 62/792,603, filed on Jan. 15, 2019.

(51) Int. Cl.
*F16B 13/08* (2006.01)
*F16M 13/02* (2006.01)

(52) U.S. Cl.
CPC ....... *F16B 13/0875* (2013.01); *F16M 13/027* (2013.01); *F16B 13/08* (2013.01)

(58) Field of Classification Search
CPC .... F16B 13/08; F16B 13/0875; F16B 13/141; F16B 33/004; F16B 43/001; F16M 13/027
USPC ... 411/82, 369, 371.1, 371.2, 383, 427, 432, 411/508–510, 913, 915
See application file for complete search history.

(56) References Cited

U.S. PATENT DOCUMENTS

| | | | | |
|---|---|---|---|---|
| 4,810,147 A * | 3/1989 | Hirohata | ................. | F16B 21/02 174/138 D |
| 5,333,978 A * | 8/1994 | Rives | .................. | B60Q 1/0433 411/369 |
| 5,733,083 A * | 3/1998 | Heminger | ............. | F16B 13/141 411/82 |
| 5,795,118 A * | 8/1998 | Osada | ................. | B29C 65/0672 411/171 |
| 6,612,795 B2 * | 9/2003 | Kirchen | ................... | F16B 21/02 24/297 |
| 7,114,221 B2 * | 10/2006 | Gibbons | ................. | F16B 5/065 24/289 |
| 7,481,474 B2 * | 1/2009 | Higgins | ................ | F16B 21/086 24/292 |

(Continued)

*Primary Examiner* — Roberta S Delisle
(74) *Attorney, Agent, or Firm* — Kofi A. Schulterbrandt

(57) ABSTRACT

A cast-in-place anchor assembly is disclosed for suspending objects below a metal deck. The assembly includes an anchor body and an anchor support. The anchor body includes a threaded opening. The anchor support includes a central member which, in use, extends from a first upper side of the metal deck to a second lower side of the metal deck. The central member further includes a connector. The central member also includes a biasing portion which cantilevers radially outward. The central member further includes a stopping member sized to be larger than a deck opening. An end of the anchor body is connected to a connector to conceal the threaded opening from poured concrete. The stop member flexes to pass through the opening in the metal deck and the stop member and the biasing member flexingly bias the anchor support into position relative to the metal decking.

17 Claims, 4 Drawing Sheets

(56) References Cited

U.S. PATENT DOCUMENTS 8,348,567 B2 * 1/2013 Schwarzkopf ...... F16B 19/1081
411/45
2018/0356033 A1 12/2018 Schramm

* cited by examiner

CAST-IN PLACE ANCHOR ASSEMBLY

FIELD

This specification relates to a cast-in-place anchor assembly for suspending objects below a metal deck after concrete pouring and concrete setting.

BACKGROUND

The Bang-It®+product is a cast-in-place anchor assembly available for purchase and aspects of the present invention are conceived to improve upon this product. Certain conventional anchors on the market have numerous separate parts that make manufacture time consuming and expensive. It would be beneficial in the industry to develop such a cast in place anchor which had less separately manufactured parts and which performed similarly to support an anchor body during concrete curing. European Patent Application No. EP17175455.9, filed Jun. 12, 2017, is also owned by applicant and discloses a similar multi-part anchor assembly. European patent Application No. EP17175455.9 is incorporated herein by reference in its entirety. European Patent Application No. EP17175455.9 corresponds with U.S. patent application Ser. No. 16/002,099 filed on Jun. 7, 2018.

Summary

According to an aspect of the present invention there is provided a cast-in-place anchor assembly for suspending objects below a metal deck after concrete pouring and concrete setting, the anchor assembly comprising: an anchor body and an anchor support. The anchor body and anchor support includes a common central axis A-A. The anchor body has a first end which includes a threaded opening and a second end. The anchor support includes a central member which, in use, extends from a first upper side of the metal deck to a second lower side of the metal deck. The central member includes a first end and a second end. The central member further includes a connector at the central member first end. The central member also includes a biasing portion which may be cantilevered outward from the central member and from the common central axis. The central member further includes a stopping member where an outer peripheral size of the stopping member is larger than the opening in the decking. The first end of the anchor body may be connected to the connector to conceal the threaded opening from poured concrete. In use, the stop member may flex to pass through the opening in the metal deck and may be disposed on a second lower side of the decking member. Also in use, the biasing portion is disposed on the first upper side of the metal decking and flexes against that decking upper side (transferring load to the stop member directly via the central member) to exert an upward biasing force by the stop member onto the second lower side of the metal to sealingly cover the opening in the decking. Likewise and similarly, the stop member may flex to exert a force (via the central member) on the biasing portion to contact the upper metal deck side to seal the deck opening from concrete flow.

BRIEF DESCRIPTION OF THE DRAWINGS

Embodiments will now be described by way of non-limiting example with reference to the accompanying drawings in which.

DETAILED DESCRIPTION

Figure 1:
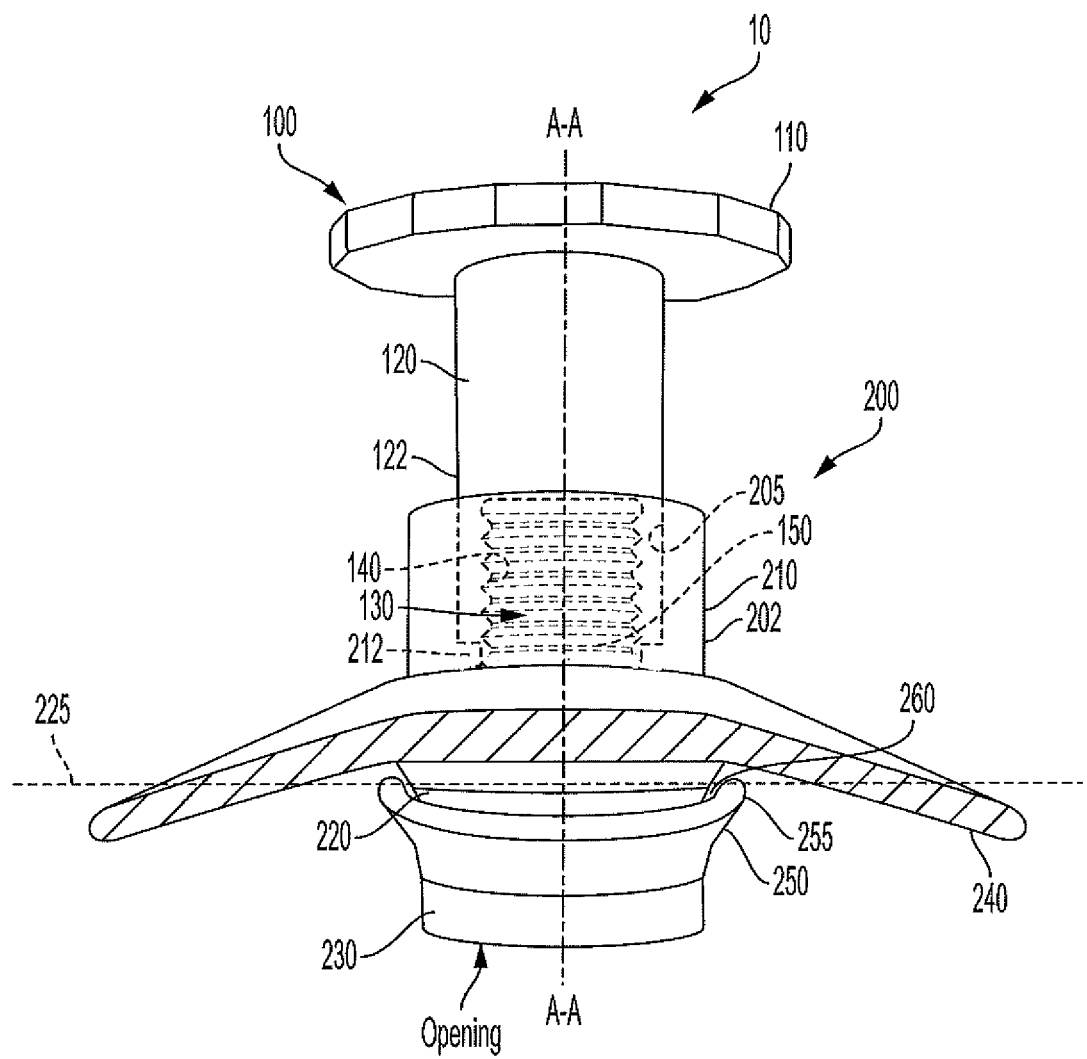
FIG. 1 is a perspective partial cross-sectional view of the anchor assembly of the present invention.
Figure 2:
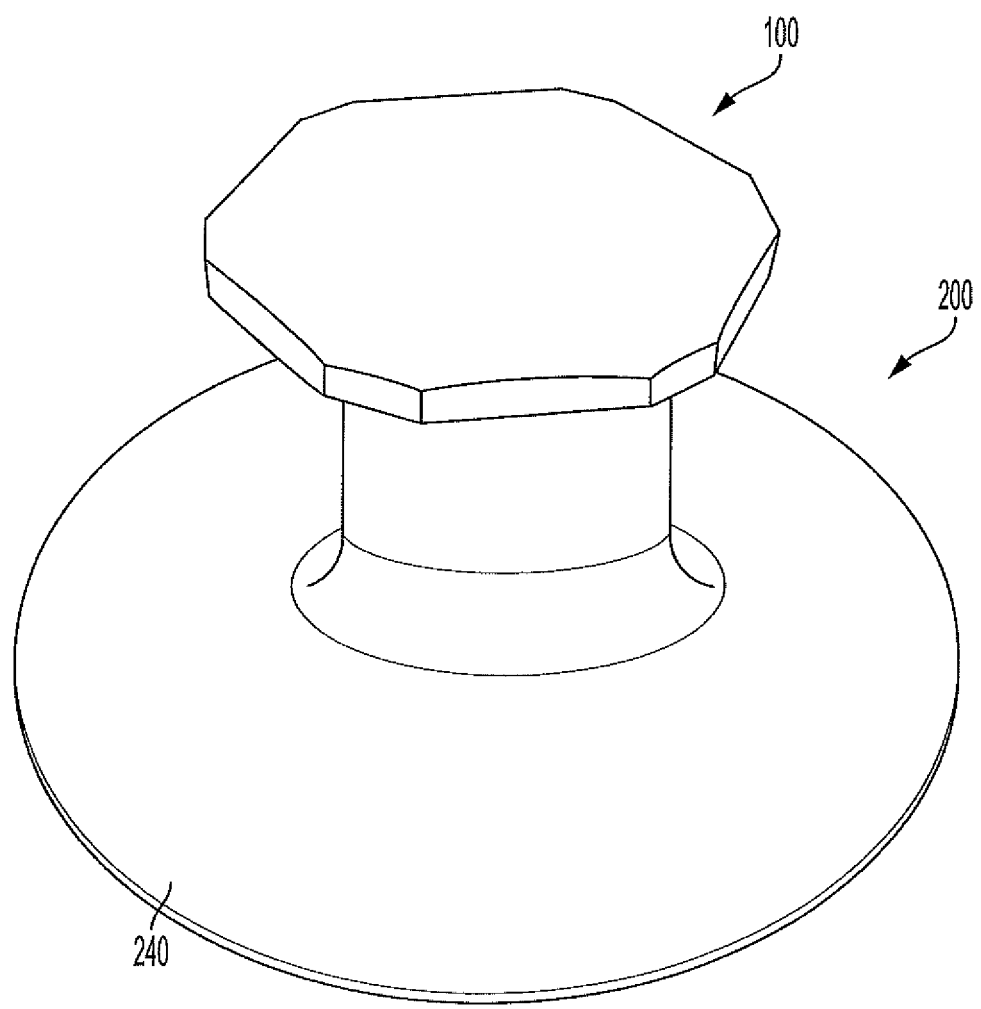
FIG. 2 is a top perspective view of the anchor assembly of FIG. 1.
Figure 3:
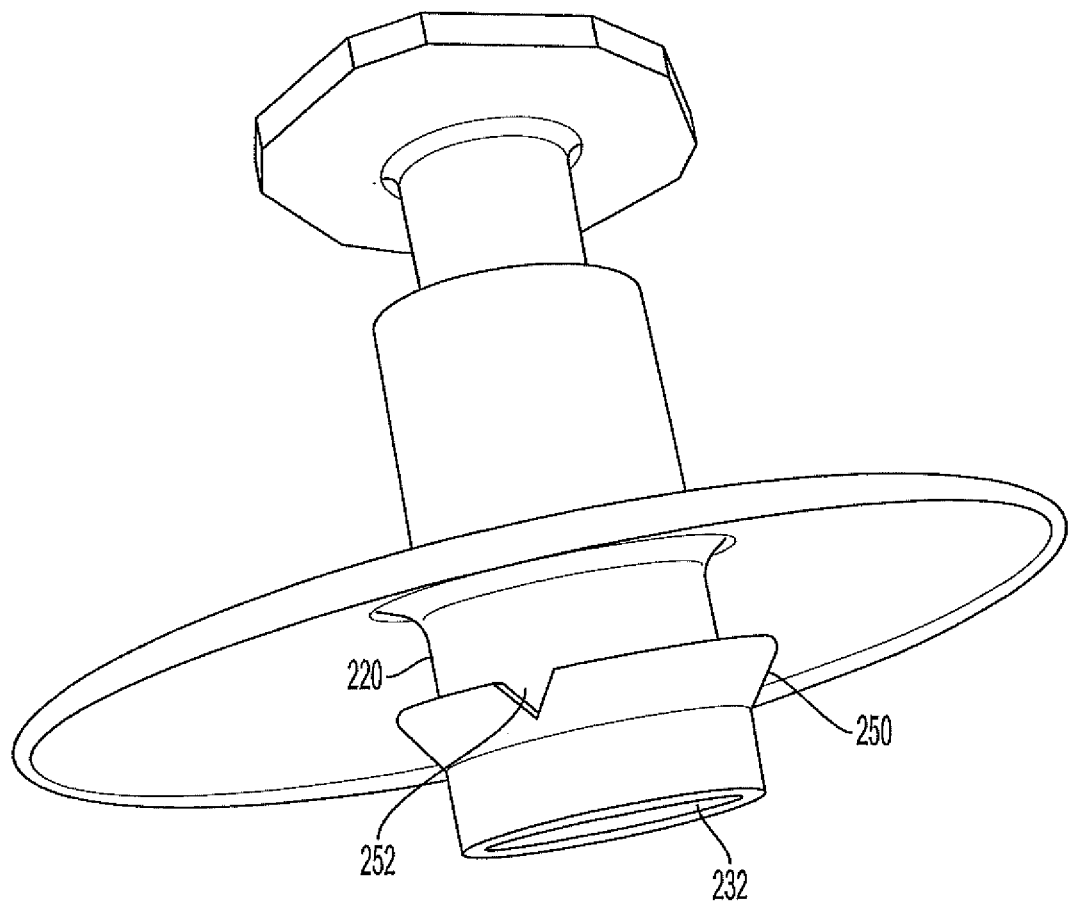
FIG. 3 is bottom perspective view of the anchor assembly of FIG. 1.
Figure 4:
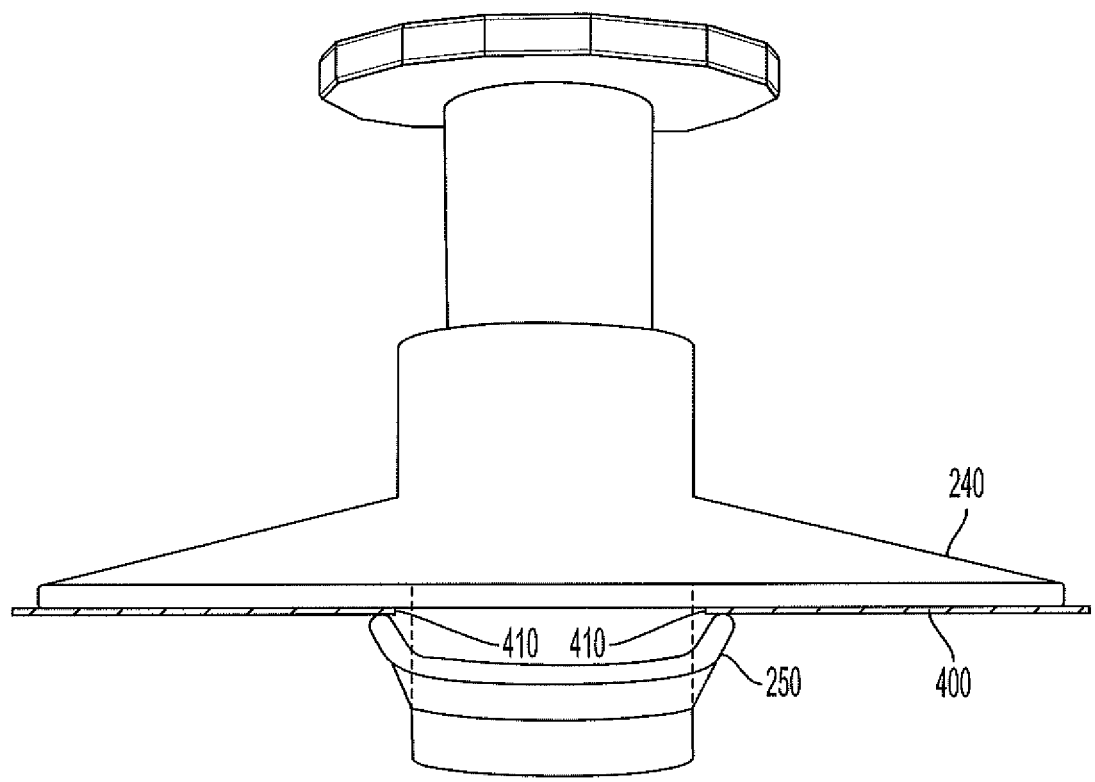
FIG. 4 is a side perspective view of the anchor assembly of FIG. 1 assembled into a hole in metal decking.

A cast-in-place anchor assembly 10 for suspending objects below a metal deck after concrete is poured onto the metal deck is illustrated in FIGS. 1-4. An anchor assembly 10 includes an anchor body 100 and an anchor support 200. Anchor body 100 may be made of metal such as steel or aluminium. Anchor body 100 may include a first end having a shank 120 and a threaded bore 130 with a thread 140 therein. Anchor body 100 may also include a second end with a flange 110 thereon. Flange 110 may be disposed anywhere along the axial length of anchor body 100 (including at the second end) as long as the flange 110 is embedded in the concrete. The closer flange 110 is to the second end, the more load the anchor body will be able to withstand when threads 140 are loaded downward.

Anchor assembly 10 also includes an anchor support 200. Anchor support 200 may be made of a flexible material that deforms as a result of installation or concrete load forces without breaking and/or flexes back to an original form when unloaded. The flexible material may include a material from the group of Delrin or other flexible plastic, rubber, glass filled nylon, and a thin profile spring quality steel such as 1095 or 5160). Anchor support 200 may include a central member 202 which extends along central axis A-A. Central member 202 includes a central longitudinal through passage 201 through which a threaded suspension rod (not shown) may pass in order to engage the rod with threads 140. A first end of central member 202 may include a connector or sleeve 210. Sleeve 210 of anchor support 200 may have an opening 205 for receiving an outer surface of the first end of anchor body 100 in a friction or interference fit. In another embodiment the friction fit may be a threaded fit or some other shaped structural locking fit or positively keyed locking fit. The friction fit may prevent concrete from entering threaded bore 130 when assembly 10 is submerged under flowable uncured concrete. Sleeve 210 may include a limit member 210 which takes the form of a projection or ring protruding radially inward from sleeve or opening 205. Limit member 212 engages with shank 120 to limit the telescopic distance anchor body 100 may be inserted into sleeve 210 of anchor support 200. Limit member 212 may project inwardly to limit the distance an end of shank 120 may extend into opening 205. Alternatively, limit member 212 may be an inwardly projecting ring that lodges in an external groove in an exterior surface of shank 120 to securely position shank 120 relative to opening 205 in the axial direction. Anchor support 200 may be made or molded into a single piece of flexible material, or may be molded from multiple pieces of flexible material that are pressed or fitted together. When the flexible pieces are fitted together, they may be of the same flexible material or different flexible materials. Anchor support 200 need only maintain appropriate concrete boundaries, support the anchor member within the concrete until concrete curing, and maintain an unblocked path to threads 140.

Anchor support 200 also includes a biasing portion 240 extending radially outward from central member 202. Biasing portion 240 may take the form of one or more radially extending individual legs or may be a continuous circumferential skirt. The flexible properties of the material from which anchor support 200 is made enable biasing portion 240 (e.g., when the biasing portion is a skirt) to conform to the top surface of the metal decking 400 even if some debris gets between the skirt 240 and the top side of metal decking 400.

Anchor support 200 also includes a stop member 250. Stop member 250 extends radially outward from central member 202. Like biasing portion 240, stop member may take the form of individual legs or may be a continuous ring. The metal decking 400 into which assembly 10 is to be installed includes an opening 410 (e.g., a circular opening). An outer periphery (e.g., radius) of stop member 250 is larger than decking opening 410 in the metal decking 400. The legs or skirt of stop member 250 may extend upward and may include an inclined outer engagement surface 255 with respect to axis A-A that may come into contact with the metal decking hole 410 as anchor support 200 is installed. A flex gap 252 defines at least one or more stop member 250 legs which may thereby promote additional stop member 250 flexibility. In addition, flex space 260 allows stop member 250 to flex toward central axis A-A during installation. A lowermost portion of biasing portion 240 is lower than an uppermost portion of stop member 250 so that if metal decking 400 is disposed between the two, those cantilevered elements must flex to biasingly sandwiched the decking 400 therebetween (see FIG. 4).

An engagement portion 220 of central member 202 is disposed between biasing portion 240 and stop member 250 may have a diameter that is smaller than deck opening 410 into and through which anchor support 200 is inserted or installed. In other words, in an uninstalled assembly, if the space where metal decking 410 is to be positioned defines a perpendicular plane 225 (with respect to the central axis) through engagement portion 220, a lowermost biasing portion 240 extends downward past plane 225 and an uppermost stop member 250 extends upward past the plane 225.

Engagement portion 220 may be tapered along its axial length such that a lower portion is smaller than decking opening 410 and an upper portion is at least slightly larger than the lower portion and/or larger than decking opening 410. Central member 202 also includes a lead portion 230 containing a lead opening 232. Lead portion 230 may have a smaller outermost diameter than decking opening 410. The smaller outer diameter promotes easy insertion of anchor support 200 into decking opening 410. Lead portion may also include a tapered shape for compliance as long as the central longitudinal through passage 201 is maintained to allow a threaded rod to pass therethrough.

As mentioned above, this disclosure incorporates U.S. patent application Ser. No. 16/002,099 by reverence in its entirety. Application No. '099 discloses an anchor for the same or similar purpose. The disclosure of that application includes numerous features that may be combined with the novel features first disclosed in this application. For example, lead portion 230 may include a cover portion (68 as shown in that incorporated application) having a plurality of flaps (74 as shown in that incorporated application). In addition, lead portion may be made in different colors which enable an installer to visually distinguish between anchors when observing from below the metal decking. Furthermore, lead portion 230 may include scored or other type of break-away portions which would enable an installer to visually distinguish anchors.

In use, an installer inserts a first threaded end of anchor body 100 into sleeve 205 of anchor support 200 until a lower most end of anchor body 100 engages limit member 212. Standing above the metal decking before concrete pouring, the installer then inserts lead portion 230 into deck opening 410 until engagement surface 255 of stop member 250 contacts deck opening 410. The installer then urges anchor support 200 downward until the skirt or legs of stop member 250 flex radially inward to the size of deck opening 410 and pass through deck opening 410. After the passing of stop member 250 through deck opening 410, downward advancement of anchor support is stopped by an engagement between deck opening 410 and engagement portion 220 and/or by engagement between biasing portion 240 and a top of metal decking 400. By the time anchor support 200 advancement is stopped, skirt or legs of stop member 250 have axially cleared deck opening 400 and are able to flex radially outward to their normal at rest position below decking 400 and with an outermost extent having a greater size or radius than deck opening 410. Metal decking is therefore now trapped between biasing member 240 on an upper side and stop member 250 on a lower side. Again, because a lower most portion of biasing portion 240 extends downward below uppermost portion of stop member 250, both of stop member 250 and biasing member 240 work to trap metal decking 400 therebetween and flex to urge anchor support 200 into a desired axial position relative to metal decking 400.

In this disclosure upward means upward with respect to gravity since the metal decking has to be below the concrete which it supports.

The invention claimed is:

1. A cast-in-place anchor assembly for suspending objects below a metal deck after concrete pouring and concrete setting by inserting the assembly into an opening in the decking before concrete pouring, the anchor assembly comprising:
    an anchor body and an anchor support, the anchor body and anchor support including a common central axis;
    the anchor body having a first end including a threaded opening and having a second end;
    the anchor support including
        a central member which, in use, extends from a first upper side of the metal deck to a second lower side of the metal deck, the central member including a first end and a second end, the anchor support further including
        a connector at the central member first end, the anchor support further including a biasing portion, the bias portion being cantilevered outward from the central member and from the common central axis,
        the anchor support further including a stopping member extending radially outward from the central member, an outer peripheral size of the stopping member being larger than the opening in the decking;
    wherein the first end of the anchor body is connected to the connector to conceal the threaded opening from poured concrete; wherein, in use, the stop member is disposed on a second lower side of the decking member and flexes to pass through the opening in the metal deck; and wherein, in use, the bias portion is disposed on the first upper side of the decking, the bias portion exerting a biasing force on the stop member upward against the second lower side of the metal decking.

2. The anchor assembly of claim 1, wherein the anchor support is a unitary body.

3. The anchor assembly of claim 1, wherein the anchor support is made of a flexible material.

4. The anchor assembly of claim 3, wherein the flexible material is one of the group of a polymer and rubber.

5. The anchor assembly of claim 1, wherein the bias portion contacts the first upper side of the metal deck to prevent concrete from reaching the opening in the metal deck.

6. The anchor assembly of claim 5, wherein the bias portion includes individual legs.

7. The anchor assembly of claim 1, wherein the anchor support is a one-piece body.

8. The anchor assembly of claim 1, wherein the stop member and the biasing portion flex to trap and position the anchor support with respect to the metal decking.

9. A cast-in-place anchor assembly for suspending objects below a metal deck after concrete pouring and concrete setting by inserting the assembly into an opening in the decking before concrete pouring, the anchor assembly comprising:
 an anchor body and an anchor support, the anchor body and anchor support including a common central axis;
 the anchor body having a first end including a threaded opening and having a second end;
 the anchor support including
 a central member which, in use, extends from a first upper side of the metal deck to a second lower side of the metal deck, the central member including a first end and a second end, the anchor support further including
 a connector at the central member first end, the anchor support further including a biasing portion, the bias portion being cantilevered outward from the central member and from the common central axis,
 the anchor support further including a stopping member extending radially outward from the central member, an outer peripheral size of the stopping member being larger than the opening in the decking;
wherein the biasing portion is also a seal for preventing escape of concrete to the opening in the metal decking.

10. The anchor assembly of claim 9, wherein the connector is a unitary body.

11. The anchor assembly of claim 9, wherein the connector is made of a flexible material.

12. The anchor assembly of claim 11, wherein the flexible material is one of the group of a polymer and rubber.

13. The anchor assembly of claim 11, wherein the bias portion includes individual legs.

14. The anchor assembly of claim 9, wherein the bias portion contacts the first upper side of the metal deck to prevent concrete from reaching the opening in the metal deck.

15. The anchor assembly of claim 9, wherein the connector is a one-piece body.

16. The anchor assembly of claim 9, wherein the anchor body further includes a flange toward a second end from the threaded opening.

17. The anchor assembly of claim 9, wherein the stop member and the biasing portion flex to trap and position the anchor support with respect to the metal decking.

* * * * *